United States Patent [19]

Long

[11] 3,974,354
[45] Aug. 10, 1976

[54] MICROWAVE UTENSIL WITH REFLECTIVE SURFACE HANDLE

[75] Inventor: George B. Long, Dayton, Ohio
[73] Assignee: General Motors Corporation, Detroit, Mich.
[22] Filed: June 4, 1975
[21] Appl. No.: 583,543

[52] U.S. Cl. .................. 219/10.55 E; 99/DIG. 14; 426/107; 426/241
[51] Int. Cl.² ......................................... H05B 9/06
[58] Field of Search ............... 219/10.55 E, 10.55 F, 219/10.55 R, 10.55 M, 521; 425/174.2, 174.4, 174.6, 174.8; 426/107, 175, 177, 234, 241, 243; 99/DIG. 14

[56] References Cited
UNITED STATES PATENTS

| | | | |
|---|---|---|---|
| 2,714,070 | 7/1955 | Welch | 99/DIG. 14 |
| 3,219,460 | 11/1965 | Brown | 426/107 |
| 3,271,169 | 9/1966 | Baker et al. | 219/10.55 E |
| 3,302,632 | 2/1967 | Fichtner | 219/10.55 E X |
| 3,483,358 | 12/1969 | Eisler | 426/107 |
| 3,615,713 | 10/1971 | Stevenson | 426/107 |
| 3,725,645 | 4/1973 | Shevlin | 219/521 |
| 3,783,220 | 1/1974 | Tanizaki | 219/10.55 E |
| 3,853,612 | 12/1974 | Spanoudis | 219/10.55 E X |
| 3,854,023 | 8/1973 | Levinson | 219/10.55 E |
| 3,865,301 | 2/1975 | Pothier et al. | 99/DIG. 14 |
| 3,881,027 | 4/1975 | Levinson | 426/234 |

FOREIGN PATENTS OR APPLICATIONS

| | | | |
|---|---|---|---|
| 736,583 | 6/1966 | Canada | 219/10.55 E |
| 770,076 | 3/1957 | United Kingdom | 219/10.55 E |

*Primary Examiner*—Arthur T. Grimley
*Attorney, Agent, or Firm*—Frederick M. Ritchie

[57] ABSTRACT

A microwave oven has reflective walls and includes a magnetron distributing microwave energy throughout said oven. The oven includes an open top ceramic dish for supporting food to be cooked by said microwave energy. A ceramic cover closes said open top dish and each is homogeneously lossy throughout for browning food. The dish and cover have integral handle portions. Each handle portion has a first coating of reflective material on the handle portions only of said dish and said cover for reflecting microwave energy in said oven away from said handle portions to prevent heat buildup in said handle portions due to said microwave energy while the remaining lossy portions of the dish continue to facilitate the browning of food. Each handle portion has a second coating of heat insulating material on top of and coextensive respectively with each of said first coatings, said second coating having the characteristic of low heat conductivity to maintain said handle portions cool to the touch in the event there is a heat buildup in said handle portions due to conduction from the food and the remaining lossy portions of said dish.

4 Claims, 3 Drawing Figures

MICROWAVE UTENSIL WITH REFLECTIVE SURFACE HANDLE

This invention relates to microwave cooking and, more particularly, to a microwave cooking utensil with handles that do not get hot.

Historically, utensils used in microwave heating applications were of materials having low "loss" in the electromagnetic field such as certain glasses, ceramics, plastics, and paper. This characteristic was desirable for obvious reasons, among which are cooking efficiency or speed. These utensils remain relatively cool and generally may be handled without experiencing a burn.

The lack of surface heating of the food load, however, causes the characteristic "microwave" appearance — a lack of browning and, in certain foods, of adequate cooking.

More recently an opposite approach has been taken — that of using "lossy" utensils, generally, a "loaded" ceramic in nature which is heated by and at the expense of microwave energy for the specific purpose of browning the food load. This is a covered dish or platter which is heated to a temperature of 300°–400° F. or so. Lossy refers to a material that has relatively high energy absorption when subjected to electrical or magnetic fields in the microwave frequency region. Normally good insulators (various dielectrics, for example) may heat in a microwave oven — they are to a degree "lossy." In my reference, however, a ceramic dish (normally, minimally lossy) may be combined or loaded with ferrimagnetic materials (silicon carbide, for example) or ferromagnetic materials (barium titanate, for example, having a Curie point effect that may limit absorption and heating at an elevated temperature) to make a highly lossy material. Such material is highly absorptive of microwave energy, elevating the temperature to 400° F. or so to obtain browning in this application. Now, a problem of handling such a dish is presented. Whereas the early microwave utensil was "cool," this dish is unsuspectingly hot and requires hot pads.

Others in the prior art have offered browning skillets for microwave ovens wherein the skillet rim is designed to remain cool. The rim passes microwave energy and remains cool while lossy material is located in the bottom of the skillet which gets hot. But adding lossy material selectively to the bottom only adds to stresses in the skillet and makes skillet manufacture difficult. Others have simply used a detachable handle which is added when the rim gets hot by conduction. This, too, is a complicated solution to the problem.

My invention is directed to a combination cooking utensil wherein the handles are selectively coated with a shield material that reflects microwave energy — a metallic spray or deposit; foil or thin sheet metal covering — plus a heat insulating coating of the shielded handle to prevent heatup due to conduction. Without appreciably disturbing the microwave field, equipment or its operation, the utensil remains quite cool in these handling areas.

Accordingly, it is a general object of my invention to provide a cooking utensil in a microwave oven for browning foods while remaining cool to the touch in the utensil handling areas.

Another object is a ceramic utensil for browning food in a microwave oven wherein the handling areas thereof are coated with a first coating to reflect microwave energy and a second coating of heat insulating material to offset heat-up due to conduction.

Further objects and advantages of the present invention will be apparent from the following description, reference being had to the accompanying drawings wherein preferred embodiments of the present invention are clearly shown.

IN THE DRAWINGS

Figure 1:
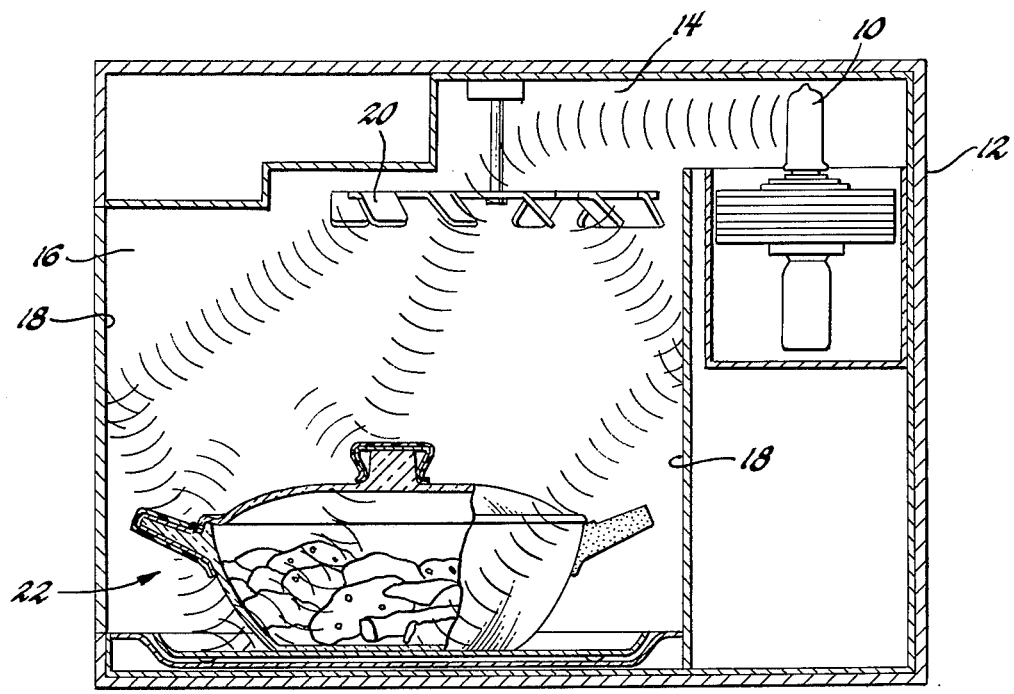
FIG. 1 is a schematic section, partly in elevation, of a microwave oven provided with my improved cooking utensil.
Figure 2:
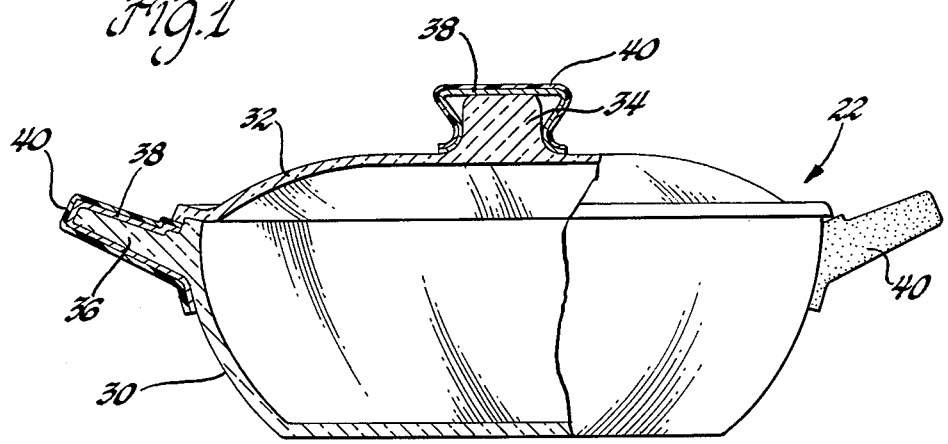
FIG. 2 is a sectional view, partly in elevation, of one embodiment of my improved cooking utensil.

By way of background, microwaves are generated in an electron tube called a magnetron 10 located at the rear of the oven 12, FIG. 1, and are guided into the oven cavity through a steel duct called a wave guide 14. Once inside the oven cavity 16, they are either absorbed by the food at once or reflected by the steel sides 18 until they enter the food and are absorbed. There is an air-driven, fan-like device called a stirrer 20 at the top of the oven cavity. As the stirrer rotates, it causes the microwaves to reflect randomly (stirs them up so that they do not all follow the same paths). If the waves are not randomly reflected, certain areas of the food would be overcooked and other areas would have barely started to cook.

A cooking utensil 22 is adapted, in accordance with my invention, for use in the microwave oven 12. The utensil is comprised of a ceramic dish 30 and cover 32 which are lossy throughout to heat in the presence of microwave energy for browning the food load therein. Handling areas 34, 36 of both the cover and dish are coated with a metal shield 38 that reflects microwave energy. The metal shield is sufficiently thin to be of low thermal mass so that such handling areas will not heat due to the presence of microwave energy.

Since with microwave frequency there is no magnetic field at a reflective surface — in this instance at the surface of the metal shield — there is negligible or very little heating of any thin coating.

However, the described shielded handle will get warm or hot from conduction in certain instances (covered dish, steaming for example) as opposed to any electrical losses which would be insignificant.

Therefore, a thin (so microwave heating will be minimized) heat insulating coating or cover 40 is added to the shielded areas. Insulation refers to a barrier to heat conduction from the hot dish, which tends to keep the metallic handle surface relatively cool to the touch when handling the utensil. This could be in the form of plastic coated metal one thirty-second to one-eighth inch thick, the plastic being Teflon, polypropylene, phenolic or similar "low loss" and otherwise suitable material such as asbestos. A porcelain coating would have a similar desirable thermal characteristic, as would spray-on Teflon.

Figure 3:
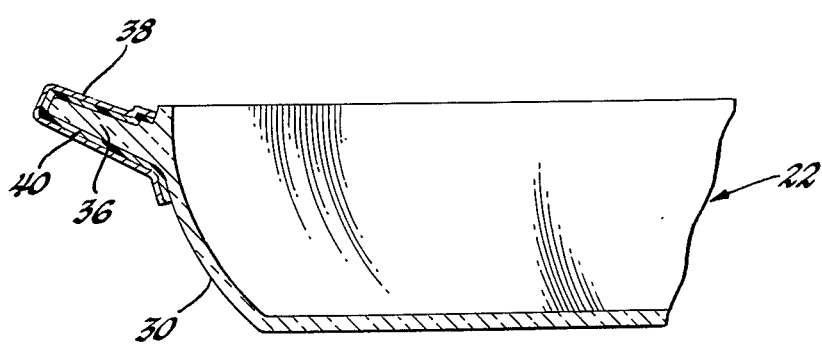
FIG. 3 is a sectional view, partly in elevation, of another embodiment of my invention.

The coatings' low thermal mass (metal shield 38), coupled with its relatively low heat conductivity (plastic 40), maintains the handling areas cool to the touch in the event there is a buildup of heat in the handling areas due to conduction. Of course, a similar characteristic could be obtained by heat insulating the shield areas from the utensil, see FIG. 3, i.e., a reversal of the two coatings 38, 40. In this application, the low heat conductivity coating 40 could also be a one thirty-second to one-eighth inch air gap. In any event, the low heat conductivity coating is shielded from microwave energy by detail design of the shielded handle substantially to exclude microwave absorption and to eliminate any arcing.

While the embodiments of the present invention as herein disclosed constitute preferred forms, it is to be understood that other forms might be adopted.

What is claimed is:

1. In a microwave oven having reflective walls and including a magnetron and a stirrer for randomly distributing microwave energy from said magnetron toward said walls and throughout said oven, the improvement comprising a utensil in said oven having an open top dish for supporting food to be cooked by said microwave energy and a cover closing said open top, said dish being formed of a ceramic container portion with a pair of integral handle portions and being homogeneously lossy throughout all said portions for browning the food, said cover being formed of a ceramic container portion with an integral handle portion and being homogeneously lossy throughout all said portions for browning the food, a first coating of reflective shield material on the handle portions only of said dish and said cover reflecting microwave energy in said oven away from said handle portions to prevent heat buildup in said handle portions due to said microwave energy, and a second coating of heat insulating material on said handle portions coextensive respectively with each of said first coatings, said second coating having the characteristic of low heat conductivity to maintain said handle portions cool to the touch in the event there is a heat buildup in said handle portions due to conduction from said container portions of said utensil.

2. The improved utensil in the microwave oven of claim 1 wherein the first coating of reflective shield material is metallic foil directly on said handle portions and said second coating of heat insulating material directly covers said first coating to a thickness of substantially one thirty-second to one-eighth inch.

3. The improved utensil in the microwave oven of claim 1 wherein the second coating is an air gap spacing said first coating from said handle portions substantially one thirty-second to one-eighth inch.

4. In a microwave oven having reflective walls and including a magnetron and a stirrer for randomly distributing microwave energy from said magnetron toward said walls and throughout said oven, the improvement comprising a utensil in said oven having an open top dish for supporting food to be cooked by said microwave energy and a cover closing said open top, said dish being formed of a ceramic container portion with a pair of integral handle portions and being homogeneously lossy throughout all said portions for browning the food, said cover being formed of a ceramic container portion with an integral handle portion and being homogeneously lossy throughout all said portions for browning the food, a first coating of reflective metallic foil directly on the handle portions only of said dish and said cover reflecting microwave energy in said oven away from said handle portions and sufficiently thin to be of low thermal mass to prevent heat buildup in said handle portions due to said microwave energy, and a second coating of heat insulating material on said handle portions on top of and coextensive respectively with each of said first coatings, said second coating having the characteristic of low heat conductivity to maintain said handle portions cool to the touch in the event there is a heat buildup in said handle portions due to conduction from said container portions of said utensil, said second coating being taken from the group consisting of tetraflouroethylene, polypropylene, phenolic, asbestos or porcelain.

* * * * *